United States Patent
Dowty et al.

(10) Patent No.: US 11,124,300 B2
(45) Date of Patent: Sep. 21, 2021

(54) BUSINESS CLASS ALL AISLE ACCESS PASSENGER SEAT CONFIGURATION

(71) Applicant: B/E Aerospace, Inc., Winston-Salem, NC (US)

(72) Inventors: Mark B. Dowty, Rural Hall, NC (US); Eric J. Aulet, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 275 days.

(21) Appl. No.: 16/192,190

(22) Filed: Nov. 15, 2018

(65) Prior Publication Data

US 2020/0156794 A1    May 21, 2020

(51) Int. Cl.
    *B64D 11/06*    (2006.01)

(52) U.S. Cl.
    CPC ...... *B64D 11/0601* (2014.12); *B64D 11/0606* (2014.12); *B64D 11/0641* (2014.12)

(58) Field of Classification Search
    CPC ............ B64D 11/0601; B64D 11/0602; B64D 11/0604; B64D 11/0605; B64D 11/0606; B64D 11/0641
    See application file for complete search history.

(56) References Cited

U.S. PATENT DOCUMENTS

| | | | | |
|---|---|---|---|---|
| 3,119,441 A * | 1/1964 | Furry, Jr. | ............. | B64C 1/1407 160/212 |
| 4,165,846 A * | 8/1979 | Groeger | ................. | B60B 3/048 244/2 |
| 6,305,644 B1 * | 10/2001 | Beroth | ................... | B64D 11/00 244/118.5 |
| 6,347,590 B1 * | 2/2002 | D'Annunzio | ......... | B60N 3/002 108/25 |
| 6,644,736 B2 * | 11/2003 | Nguyen | ............. | B64D 11/0606 297/184.17 |
| 7,178,871 B1 * | 2/2007 | Round | ............... | B64D 11/0601 297/244 |
| 7,347,399 B2 * | 3/2008 | Bouchet | ................... | B64C 1/10 244/121 |
| 7,703,718 B2 * | 4/2010 | Saint-Jalmes | ......... | B64D 11/00 244/118.6 |
| 7,918,504 B2 * | 4/2011 | Thompson | ......... | B64D 11/0606 297/248 |
| 8,091,961 B2 * | 1/2012 | Dryburgh | ........... | B64D 11/0606 297/184.1 |

(Continued)

FOREIGN PATENT DOCUMENTS

| EP | 2828163 B1 | 6/2016 |
|---|---|---|
| WO | 2009/066054 A2 | 5/2009 |

*Primary Examiner* — Medhat Badawi
(74) *Attorney, Agent, or Firm* — Suiter Swantz pc llo

(57) ABSTRACT

An aircraft passenger seat arrangement such as a business seating class arrangement including a plurality of passenger seat groups positioned adjacent a longitudinal aisle, each passenger seat group including an inboard seat and an outboard seat angled toward the longitudinal aisle, with the inboard seat angle being greater than the outboard seat angle to improve access to the outboard seat along a branch aisle extending from the longitudinal aisle forward of the inboard seat to a forward end of the outboard seat, as well as reducing seat pitch between longitudinally adjacent inboard and outboard seats with at least equivalent seat egress.

15 Claims, 14 Drawing Sheets

(56) References Cited

U.S. PATENT DOCUMENTS

| | | | |
|---|---|---|---|
| 8,152,096 B2* | 4/2012 | Smith | B64C 29/0033 244/60 |
| 8,317,135 B2* | 11/2012 | Carter | B64C 1/143 244/129.5 |
| 8,800,912 B2* | 8/2014 | Oliver | B64C 39/08 244/12.4 |
| 8,833,699 B2* | 9/2014 | Hanson | E05B 65/0894 244/129.4 |
| 8,864,071 B2* | 10/2014 | Vergnaud | B60N 2/34 244/118.6 |
| 8,998,139 B2* | 4/2015 | Dryburgh | B64D 11/0604 244/118.6 |
| D733,442 S * | 7/2015 | Dryburgh | D6/356 |
| 9,126,689 B2 | 9/2015 | Porter | |
| 9,266,613 B2* | 2/2016 | Henshaw | B64D 11/0643 |
| 9,315,270 B2 | 4/2016 | Dryburgh et al. | |
| 9,382,007 B2* | 7/2016 | Ersan | B64D 11/0641 |
| 9,446,848 B2* | 9/2016 | Jerome | B64D 11/0641 |
| 9,469,404 B2* | 10/2016 | Darbyshire | B64D 11/0606 |
| 9,550,573 B2* | 1/2017 | Ersan | B64D 11/0646 |
| 9,580,176 B2* | 2/2017 | Ehlers | B64D 11/06 |
| 10,093,422 B2* | 10/2018 | Braca | B64D 11/0601 |
| 10,479,506 B1* | 11/2019 | Colletti | B64D 11/0606 |
| 10,517,406 B2* | 12/2019 | McAlpine | A47C 20/027 |
| 10,661,903 B2* | 5/2020 | Dowty | B64D 11/0605 |
| 10,773,804 B2* | 9/2020 | Valdes De La Garza | B64D 11/0605 |
| 2001/0003962 A1* | 6/2001 | Park | B64D 11/0601 108/140 |
| 2002/0070314 A1* | 6/2002 | Schmidt-Schaeffer | B60N 2/34 244/118.6 |
| 2003/0085597 A1* | 5/2003 | Ludeke | B64D 11/0644 297/184.14 |
| 2005/0103934 A1* | 5/2005 | Smith, Jr. | B64C 1/00 244/118.1 |
| 2005/0194827 A1* | 9/2005 | Dowty | B60N 2/643 297/411.3 |
| 2007/0040434 A1* | 2/2007 | Plant | B64D 11/0643 297/354.13 |
| 2007/0069073 A1* | 3/2007 | Ferry | B60N 2/309 244/118.6 |
| 2007/0085389 A1* | 4/2007 | Schurg | B64D 11/0606 297/184.1 |
| 2007/0152100 A1* | 7/2007 | Saint-Jalmes | B64D 11/0604 244/118.6 |
| 2007/0246981 A1* | 10/2007 | Plant | B64D 11/064 297/248 |
| 2007/0295863 A1* | 12/2007 | Thompson | B64D 11/00153 244/118.6 |
| 2009/0146004 A1* | 6/2009 | Plant | B64D 11/06 244/118.5 |
| 2009/0243358 A1* | 10/2009 | Henshaw | B64D 11/0601 297/340 |
| 2010/0051746 A1* | 3/2010 | Law | A61G 5/125 244/118.6 |
| 2010/0051753 A1* | 3/2010 | Yoeli | B64C 29/0025 244/23 A |
| 2010/0052382 A1* | 3/2010 | Dryburgh | B64D 11/0601 297/232 |
| 2010/0065684 A1* | 3/2010 | Ruiter | B64D 11/0601 244/118.6 |
| 2010/0252680 A1* | 10/2010 | Porter | B60N 2/79 244/118.6 |
| 2010/0308164 A1* | 12/2010 | McKeever | B64D 11/0606 244/118.6 |
| 2012/0223557 A1* | 9/2012 | Henshaw | B64D 11/0641 297/232 |
| 2012/0292957 A1* | 11/2012 | Vergnaud | B64D 11/0643 297/188.08 |
| 2012/0298798 A1* | 11/2012 | Henshaw | B60N 2/34 244/118.6 |
| 2013/0032668 A1* | 2/2013 | Foucher | B60N 2/242 244/118.6 |
| 2013/0068887 A1* | 3/2013 | Ko | B65G 47/082 244/118.6 |
| 2013/0076081 A1* | 3/2013 | Curto | A47C 4/52 297/148 |
| 2013/0248655 A1* | 9/2013 | Kroll | B64D 11/0606 244/118.6 |
| 2014/0283296 A1* | 9/2014 | Jerome | B64D 11/0646 5/12.1 |
| 2014/0306500 A1* | 10/2014 | Dryburgh | B64D 11/0604 297/232 |
| 2014/0339362 A1* | 11/2014 | Moje | B64D 11/02 244/118.5 |
| 2015/0042078 A1* | 2/2015 | Gehret | B64D 11/06205 280/728.2 |
| 2015/0166166 A1* | 6/2015 | Llamas Sandin | B64D 11/0639 244/13 |
| 2015/0166182 A1* | 6/2015 | Ducreux | B64D 11/0601 244/118.6 |
| 2015/0166184 A1 | 6/2015 | Dryburgh et al. | |
| 2015/0329208 A1* | 11/2015 | Eakins | B64D 11/0641 297/232 |
| 2016/0332734 A1* | 11/2016 | Goode | B64D 11/0638 |
| 2017/0088267 A1* | 3/2017 | Dowty | B64D 11/06 |
| 2017/0259921 A1* | 9/2017 | Valdes De La Garza | B64D 11/0641 |
| 2017/0297719 A1 | 10/2017 | Lorsignol et al. | |
| 2018/0099752 A1* | 4/2018 | Johnson | B64D 11/0601 |
| 2019/0322371 A1* | 10/2019 | Dowty | B64D 11/0606 |
| 2020/0108934 A1* | 4/2020 | Williamson | B64D 11/0627 |
| 2020/0130805 A1* | 4/2020 | Heimbach | B64D 11/06 |
| 2020/0130837 A1* | 4/2020 | Scoley | B64C 1/1415 |
| 2020/0130845 A1* | 4/2020 | Heimbach | B64D 11/0601 |
| 2020/0140090 A1* | 5/2020 | Scoley | B64D 11/0636 |
| 2020/0156794 A1* | 5/2020 | Dowty | B64D 11/0606 |
| 2020/0262562 A1* | 8/2020 | Dowty | B64D 11/0606 |

* cited by examiner

BUSINESS CLASS ALL AISLE ACCESS PASSENGER SEAT CONFIGURATION

BACKGROUND

Commercial aircraft commonly include economy and business class seating. Rows in economy seating classes utilize laterally adjacent seats with share components such as spreaders, transverse beams and armrests to maximize seating density across the cabin width. Economy class seats are limited to shallow backrest recline to be able to position rows with a short seat pitch to maximize seating density along the cabin length. Thus, the primary consideration when configuring an economy seating class is to maximize seating density in all directions.

The primary concern when configuring business class is to maximize comfort, with seating density being a secondary consideration. As such, seats are configured with deep recline, and in some configurations, full lie flat capability. Such recline consumes longitudinal space which limits the number of seats in a column. Seats are also wider as compared to economy class seats for including monuments such as dedicated armrests, consoles, end bays, etc., which consume cabin width.

Seat egress for outboard seat passengers in economy seating classes is through the space of inboard seated passengers, which is undesirable and inconvenient, but is expected considering economy class row configurations. In business seating classes; however, passengers would not expect to have to pass through another's space to egress their seat, especially considering the fares paid for business class.

Accordingly, what is desirable is a business seating class configuration in which each passenger has his/her own seat egress path, while at the same time configuring lateral and longitudinal seat positioning to enhance privacy between adjacent passengers and maximize seating density across the cabin width and length, among other benefits and advantages.

BRIEF SUMMARY

In one aspect, an embodiment of the inventive concepts disclosed herein is directed to an aircraft passenger seat arrangement including a longitudinal aisle having an aisle axis parallel to an aircraft longitudinal axis, a passenger seat group positioned laterally adjacent the longitudinal aisle, the passenger seat group including an inboard seat positioned near the longitudinal aisle and an outboard seat positioned apart from the longitudinal aisle, the inboard seat having a longitudinal seat axis angled toward the longitudinal aisle at a first angle to the aisle axis and the outboard seat having a longitudinal seat axis angled toward the longitudinal aisle at a second angle to the aisle axis, wherein the first angle is greater than the second angle, and a branch aisle extending from the longitudinal aisle forward of the inboard seat to a forward end of the outboard seat, the branch aisle for accessing at least the outboard seat from the longitudinal aisle.

In some embodiments, the longitudinal seat axes of the inboard and outboard seats converge in a direction of a head end of the inboard and outboard seats and diverge in a direction of a foot end of the inboard and outboard seats.

In some embodiments, the first and second angles of the respective inboard and outboard seats are each between 1 degree and 45 degrees, more preferably 10 degrees and 30 degrees, with the first angle being greater than the second angle.

In some embodiments, each passenger seat group includes a shared console positioned between the inboard and outboard seats, and a movable partition disposed atop the shared console deployable in a direction of a foot end of the inboard and outboard seats and stowable in a direction of a head end of the inboard and outboard seats.

In some embodiments, each passenger seat group includes a partition, configured in one or more sections, continuous along an aft end and inboard side of the passenger seat group, the partition spaced apart from a head end of each of the inboard and outboard seats to provide room for the inboard and outboard seats to transition from an upright sitting position to a horizontal sleeping position.

In some embodiments, a portion of the partition, along the aft end of the partition between the inboard and outboard seats, contours forward in a direction of the inboard and outboard seats to receive in a nesting arrangement a monument for use by an aft-positioned like outboard seat.

In some embodiments, the partition has a greater vertical height along the aft end of the passenger seat group than along the inboard side of the passenger seat group.

In some embodiments, each passenger seat group includes a monument positioned between the longitudinal aisle and the branch aisle directly forward of the inboard seat, the monument defining an alcove opening in a direction of the inboard seat, and an ottoman disposed in the alcove for use by the inboard seat.

In some embodiments, the inboard seat is staggered in a forward direction from 2 cm to 25 cm with respect to the outboard seat, or the inboard seat is staggered in an aft direction 2 cm to 20 cm with respect to the outboard seat.

In another aspect, an embodiment of the inventive concepts disposed herein is directed to a business class aircraft passenger seat arrangement including a longitudinal aisle having an aisle axis parallel to an aircraft longitudinal axis, a plurality of passenger seat groups longitudinally aligned in a column laterally adjacent the longitudinal aisle, each of the plurality of passenger seat groups including an inboard seat positioned near the longitudinal aisle and an outboard seat positioned apart from the longitudinal aisle, the inboard seat having a longitudinal seat axis angled toward the longitudinal aisle at a first angle to the aisle axis and the outboard seat having a longitudinal seat axis angled toward the longitudinal aisle at a second angle to the aisle axis, wherein the first angle is greater than the second angle, and a plurality of branch aisles, each branch aisle extending from the longitudinal aisle to one outboard seat of a respective one of the plurality of passenger seat groups for accessing at least the one outboard seat directly from the longitudinal aisle, wherein the inboard seat is staggered in a forward direction from 2 cm to 25 cm with respect to the outboard seat or the inboard seat is staggered in an aft direction 2 cm to 20 cm with respect to the outboard seat.

In some embodiments, the longitudinal seat axes of the inboard and outboard seats of each of the passenger seat groups converge in a direction of a head end of the respective inboard and outboard seats and diverge in a direction of a foot end of the respective inboard and outboard seats.

In some embodiments, the first angle and the second angle of each of the longitudinal seat axes of each of the plurality of passenger seat groups are between 1 degree and 45 degrees, more preferably between 10 degrees and 30 degrees, with the first angle being greater than the second angle.

In some embodiments, each of the plurality of passenger seat groups includes a shared console positioned between the respective inboard and outboard seats, and a movable partition disposed atop the shared console deployable in a direction of a foot end of the respective inboard and outboard seats and stowable in a direction of a head end of the respective inboard and outboard seats.

In some embodiments, each of the plurality of passenger seat groups includes a partition, configured in one or more sections, continuous along an aft end and inboard side of the passenger seat group, the partition spaced apart from a head end of each of the respective inboard and outboard seats to provide room for the respective inboard and outboard seats to transition from an upright sitting position to a horizontal sleeping position.

In some embodiments, each of the plurality of passenger seat groups includes a first monument positioned forward of the respective inboard seat for use by the respective inboard seat and a second monument positioned forward of the respective outboard seat for use by the respective outboard, each of the first and second monuments defining an alcove facing the respective one of the inboard and outboard seats and an ottoman disposed on the alcove form use by the respective one of the inboard and outboard seats.

In a further aspect, an embodiment of the inventive aspects disclosed herein is directed to an aircraft passenger seat arrangement including a longitudinal aisle having an aisle axis parallel to an aircraft longitudinal axis, a plurality of passenger seat groups longitudinally aligned in two columns positioned along opposing sides of the longitudinal aisle, each of the plurality of passenger seat groups including an inboard seat positioned near the longitudinal aisle and an outboard seat positioned apart from the longitudinal aisle, the inboard seat having a longitudinal seat axis angled toward the longitudinal aisle at a first angle to the aisle axis and the outboard seat having a longitudinal seat axis angled toward the longitudinal aisle at a second angle to the aisle axis, wherein the first angle is greater than the second angle, and a plurality of branch aisles, each branch aisle extending from the longitudinal aisle to one outboard seat of a respective one of the plurality of passenger seat groups for accessing at least the one outboard seat directly from the longitudinal aisle.

In some embodiments, the longitudinal seat axes of the inboard and outboard seats of each of the passenger seat groups converge in a direction of a head end of the respective inboard and outboard seats and diverge in a direction of a foot end of the respective inboard and outboard seats.

In some embodiments, the first angle and the second angle of each of the longitudinal seat axes of each of the plurality of passenger seat groups are between 10 degrees and 30 degrees, with the first angle being greater than the second angle.

In some embodiments, the passenger seat groups on opposing sides of the longitudinal aisle are laterally aligned, branch aisles on opposing sides of the longitudinal aisle are laterally aligned, and all of the inboard and outboard and outboards seats of the plurality of passenger seat groups are forward facing.

In some embodiments, each of the plurality of passenger seat groups includes a partition, configured in one or more sections, continuous along an aft end and inboard side of the passenger seat group, the partition spaced apart from a head end of each of the respective inboard and outboard seats to provide room for the respective inboard and outboard seats to transition from an upright sitting position to a horizontal sleeping position.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature or function. In the drawings.

DETAILED DESCRIPTION OF EXEMPLARY EMBODIMENTS

Figure 1:
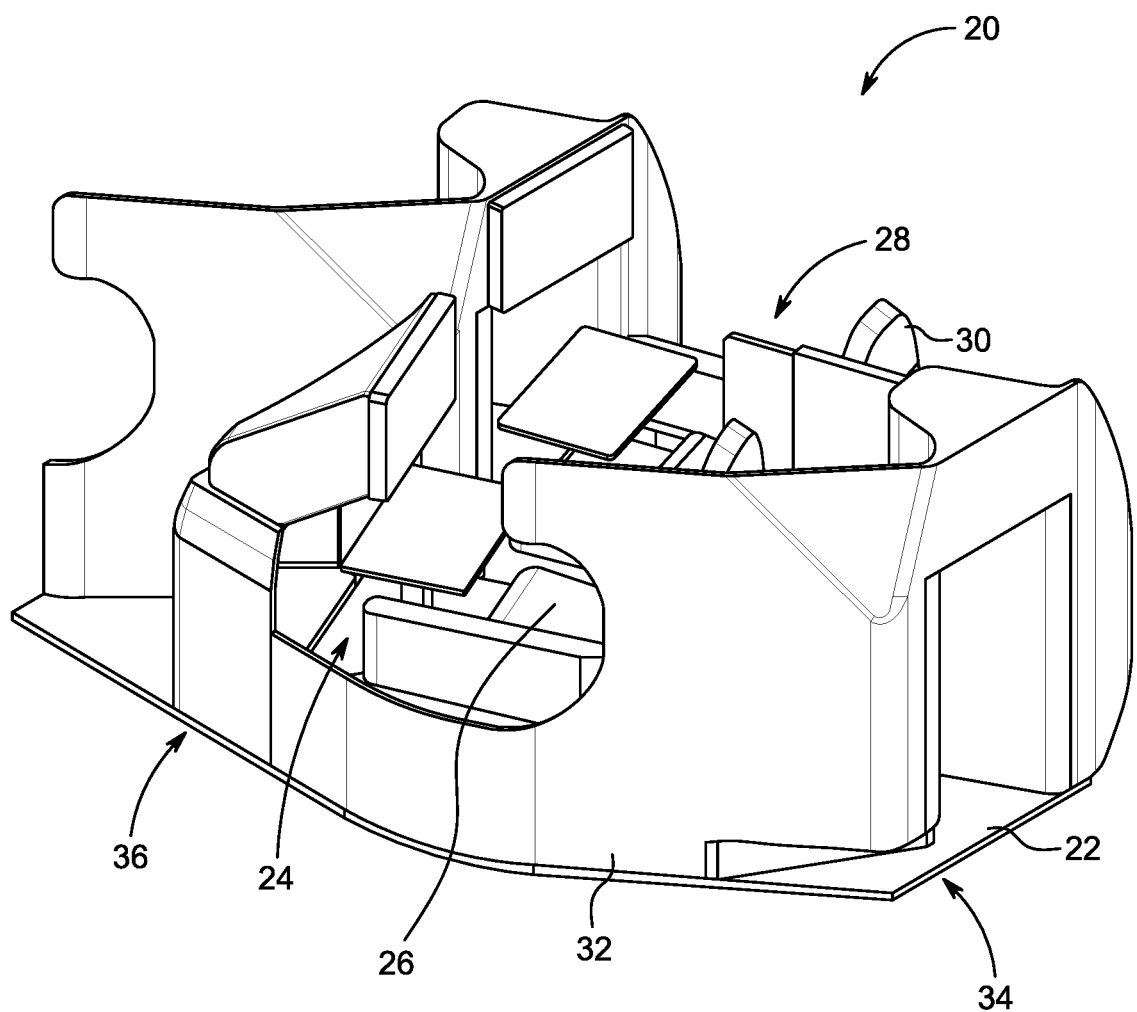
FIG. 1 is a perspective view of an inboard side of a business class passenger seat group including inboard and outboard angled passenger seats, in accordance with an embodiment of the present disclosure.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, the inventive concepts disclosed herein are generally directed to aircraft passenger seat arrangements, and more particularly, business class passenger seat arrangements. The exemplary cabin configurations disclosed herein are based on a passenger seat group generally including two laterally-adjacent and angled passenger seats. Each passenger seat group is configured to be positioned within an aircraft adjacent a longitudinal aisle having an aisle axis, for example, parallel to the aircraft longitudinal axis. Each passenger seat group, when installed in an aircraft, generally includes an inboard seat or "aisle seat" positioned near or adjacent the longitudinal aisle, and an outboard seat or "window seat" positioned apart from the longitudinal aisle, for example, adjacent the fuselage wall.

In some cabin configurations disclosed herein, passenger seat groups can be longitudinally aligned in columns having a longitudinal column axis parallel to the aisle axis. Columns containing passenger seat groups can be positioned to one side of an aisle or on opposing sides of the same longitudinal aisle. For example, an aircraft cabin configuration including a single longitudinal aisle can include two columns of passenger seat groups, for example, a port column and a starboard column. Aircraft cabin configurations including dual longitudinal aisles can include one or more columns including at least one of a port, starboard and center column. In any cabin configuration, the passenger seat group according to the inventive concepts disclosed herein includes a first seat adjacent the longitudinal aisle, referred to herein as the "inboard seat," and a second seat spaced apart from the same longitudinal aisle, and referred to herein as the "outboard seat." In this configuration, the inboard seat may or may not be directly accessible from the longitudinal aisle, depending on the partition configuration of the passenger seat group discussed further below, while the outboard seat is not directly accessible from the aisle, but is accessible from branch aisle. As used herein, the term "branch aisle" refers to an aisle that branches from the longitudinal aisle and has an aisle axis at an angle to the longitudinal aisle axis and functions to access at least the outboard seat.

In some embodiments, passenger seat groups seats may be substantially forward-facing, albeit with the inboard and outboard seats at an angle to the aircraft longitudinal axis as discussed further below. In other embodiments, passenger seat group seats may be substantially rear-facing, albeit with the inboard and outboard seats at an angle to the longitudinal axis. In other embodiments, certain columns may include forward-facing passenger seat groups while other columns may include rear-facing passenger seat groups. A column may include a single passenger seat group or at least two longitudinally-aligned passenger seat groups that nest to a degree to maximize seating density, as discussed in detail below. Branch aisles may be disposed between longitudinally-adjacent passenger seat groups or forward of a first or sole passenger seat group. In cabin configurations including passenger seat groups all facing in a common direction, whether single aisle or dual aisle cabin configurations, passenger seat groups across the longitudinal aisle may be laterally-aligned, and branch aisles for accessing at least the outboard seats may also be laterally-aligned, as discussed further below.

Business class seating arrangements may include any number of passenger seat groups, depending on the cabin width and length dedicated for business class seating. Each inboard and outboard seat of each passenger seat group generally includes a seat bottom and a backrest, also referred to herein as a "seat back." Each inboard and outboard seat may optionally include a leg rest or may utilize a separate seat infill solution that deploys to fill the gap between a forward extent of the seat and a spaced ottoman with the seat in a horizontal sleeping position. Each passenger seat is configured to transition between an upright sitting position for taxi, take-off and landing (TTOL), and a horizontal sleeping position during flight. In the horizontal sleeping position, the backrest and the seat bottom, and optionally the leg rest and/or seat infill solution and ottoman when present, are coplanar and substantially horizontal to form a flat bed. Intermediate sitting positions may be achieved by adjusting the angle of any or all of the seat bottom, backrest, leg rest, ottoman, etc. Intermediate sitting positions may include, but are not limited to, reclined sitting positions, cradle sitting positions, zero-G sitting positions, etc. Seat adjustment may be passenger and/or crew controlled by controls communicatively coupled to one or more seat actuators. Each seat may optionally include a separately adjustable headrest or a headrest integrated into the backrest.

Benefits derived from the passenger seat group and aircraft cabin configurations discussed herein incorporating the passenger seat groups include, but are not limited to, enhanced privacy between laterally adjacent seats, improved seat egress particularly with respect to the outboard seat, and maximized seating density in a business seating class.

Referring to the drawing figures, FIG. 1 shows a passenger seat group 20 according to an embodiment of the present disclosure. The passenger seat group 20 may be configured and/or installed as an assembled modular structure in whole or in pieces. The passenger seat group 20 may include a floor 22 configured to secure to the aircraft deck, for example, to seat tracks installed in the aircraft deck. The passenger seat group 20 is generally divided into two portions, with each portion accommodating a single traveling passenger. The first portion 24 or "inboard portion" includes the inboard seat 26 and amenities dedicated for use by the inboard passenger. The second portion 28 or "outboard portion" includes the outboard seat 30 and amenities dedicated for use by the outboard passenger. The first and second portions 24, 28 are generally separated and defined by one or more partitions 32.

In some embodiments, the partition 32 may be continuous along the aft end 34 and inboard side 36 of the passenger seat group 20. As used herein, the term "aft end" 34 refers to the end of the passenger seat group 20 nearest the head end of the passenger seats, and the term "forward end" refers to the end of the passenger seat group 20 closest the foot end of the passenger seats. While the terms "aft end" and "forward end" may correspond with the forward and aft ends of the aircraft is some installation configurations, they may not in others. The partition 32 may be configured in one or more sections and may be continuous along the aft end 34 and inboard side 36 of the passenger seat group 20. At the aft end 34, the partition 32 is spaced apart from the head end of each of the inboard and outboard seats 26, 30 to provide clearance for the inboard and outboard backrests to transition from the upright sitting position to the horizontal sleeping position.

A portion of the partition 32 along the aft end 34 and between the inboard and outboard seats 26, 30 contours forward in a direction of the inboard and outboard seats to receive in a nesting arrangement a monument for use by an aft-positioned like outboard seat, as discussed further below. The partition 32 in some embodiments has a greater vertical height along the aft end 34 as compared to along the inboard side 36 of the passenger seat group 20, thereby providing greater privacy between longitudinally-adjacent passenger seat groups where needed and less privacy adjacent the longitudinal aisle. The partition 32 as shown has a specific shape and contour to define the passenger living spaces and enhance or relax privacy where most desired by traveling passengers.

Figure 2:
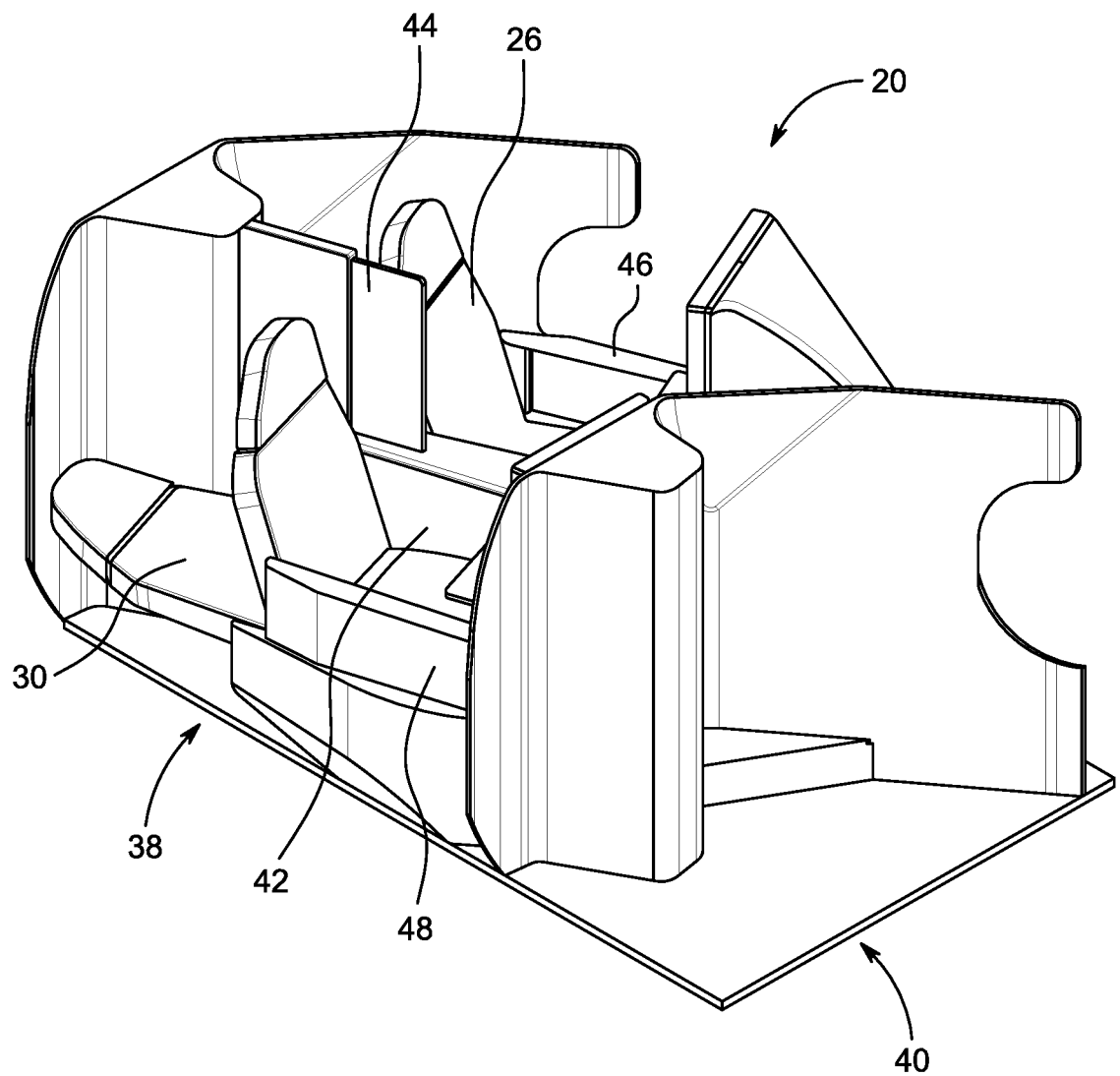
FIG. 2 is a perspective view of the outboard side of the passenger seat group of FIG. 1.

FIG. 2 shows the passenger seat group 20 from the outboard side 38 and forward end 40. The partition 32 can be omitted along the outboard side 38 in embodiments in which the outboard side is positioned against a wall or fuselage, and a partition can be added in cabin configurations in which the outboard side is positioned adjacent an aisle or another passenger seat. The figures show two like partition sections, one aft of the seats 26, 30 and one forward, to illustrate that a universal partition may be utilized to facilitate nesting and simplify manufacturing. It is understood that a single installable passenger seat group 20 may include only a single partition, provided either forward or aft of the seats.

A shared console 42, which may be an armrest or include armrest functionality among other functionality, is positioned between the inboard and outboard seats 26, 30 and serves to further define the first and second seat spaces. A movable partition 44 is disposed atop the shared console 42 and is deployable in a direction of a foot end of the inboard and outboard seats 26, 30 and stowable in a direction of a head end of the inboard and outboard seats. The movable partition 44 may be configured in a single deployable section or in telescoping sections. The movable partition can be deployed to enhance or stowed to relax privacy between traveling passengers. The inboard seat 26 is further provided with an inboard armrest 46 and the outboard seat with an outboard armrest 48, one or more of which may adjust vertically to function as an armrest in a raised position and as a bed extension in a lowered position.

Figure 3:
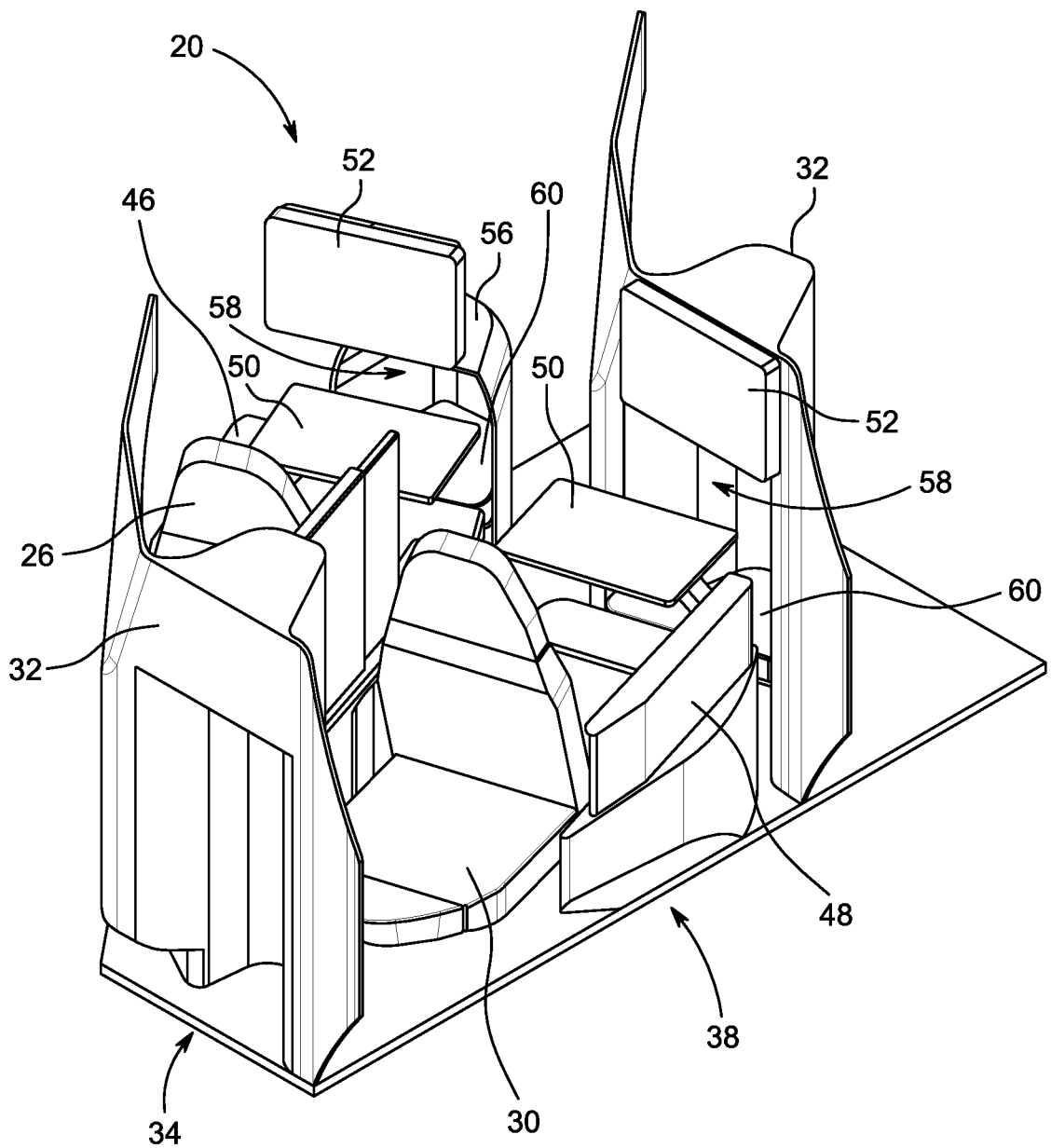
FIG. 3 is a perspective view of the aft end and outboard side of the passenger seat group of FIG. 1.

FIG. 3 shows the aft end 34 and outboard side 38 of the passenger seat group 20, as well as both the upright and horizontal positions of the outboard seat backrest. The inboard seat 26 is equipped with a tray table 50 deployable from within, for example, the inboard armrest 46. The tray table 50 may be coupled to a multi-axis hinge configured to transition the table between vertical and horizontal orientations, as well as optionally rotate the table, as the tray table moves between stowed and deployed positions. In the deployed position shown in FIG. 3, the tray table 50 achieves an over-seat use position. Outboard seat 30 may include the same tray table configuration in which the tray table 50 deploys from within the outboard armrest 48. In alternative configurations, depending upon monument positions, tray tables may deploy from forward monuments, alongside the side, etc.

Each passenger seat group portion is further equipped with a dedicated video monitor 52. The video monitor 52 that serves the inboard seat 26 is coupled to a housing (see FIG. 4 at 54) mounted atop a monument 56 positioned forward of the inboard seat 26 such that the video monitor overhangs the leg space dedicated of the inboard traveling passenger. The monument 56 defines an alcove 58 in a facing direction of the inboard seat 26. An ottoman 60 is disposed in the alcove 58 for use by the inboard seated passenger at a height such that the top surface of the ottoman 60 is coplanar with the bed surface of the inboard seat 26 is in the horizontal sleeping position, as a further bed extension.

The outboard seat portion is also equipped with a video monitor 52 for use by the outboard seated passenger. The outboard video monitor 52 may be affixed to the backside of a forward-positioned like partition 32 behind a forward-positioned like outboard seat. In cabin configurations lacking a like forward-positioned partition, for example, the first row of a business seating class, the outboard video monitor 52 may be affixed to another structure, partition, wall, armrest, etc. Each video monitor 52 may be adjustable in height and/or viewing angle. The outboard seat portion is also equipped with an ottoman 60 disposed in the alcove 58 below the outboard video monitor 52, wherein the alcove is provided in the rear face of the like forward partition.

Figure 4:
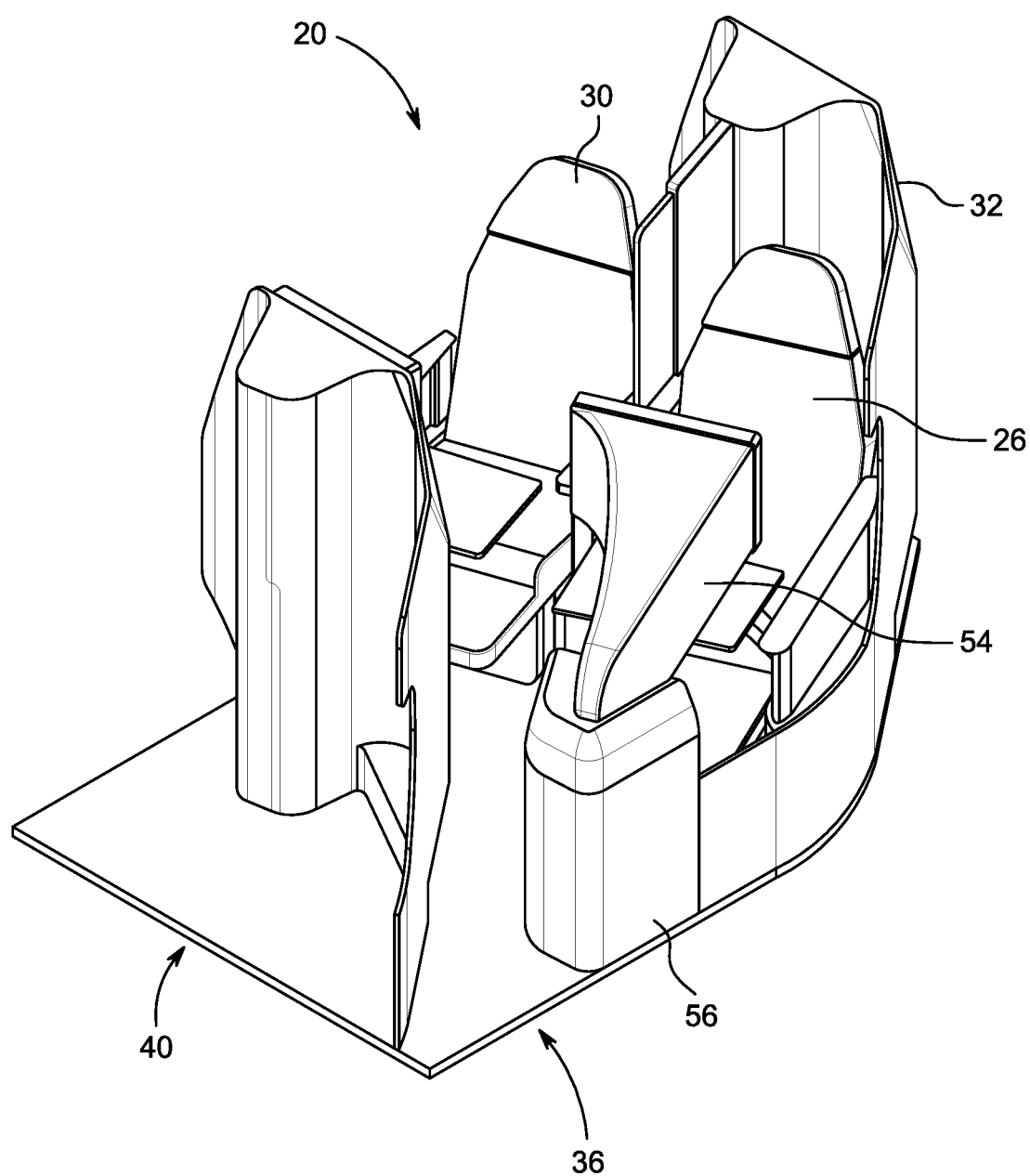
FIG. 4 is a perspective view of the forward end and inboard side of the passenger seat group of FIG. 1.

FIG. 4 shows the forward end 40 and inboard side 36 of the passenger seat group 20. Assuming a longitudinal aisle positioned adjacent the inboard side 36, the inboard seat 26 is separated from the aisle by the inboard extension of the partition 32. The partition portion alongside the inboard seat 26 may extend forward near the head of the passenger to further enhance privacy.

Figure 5:
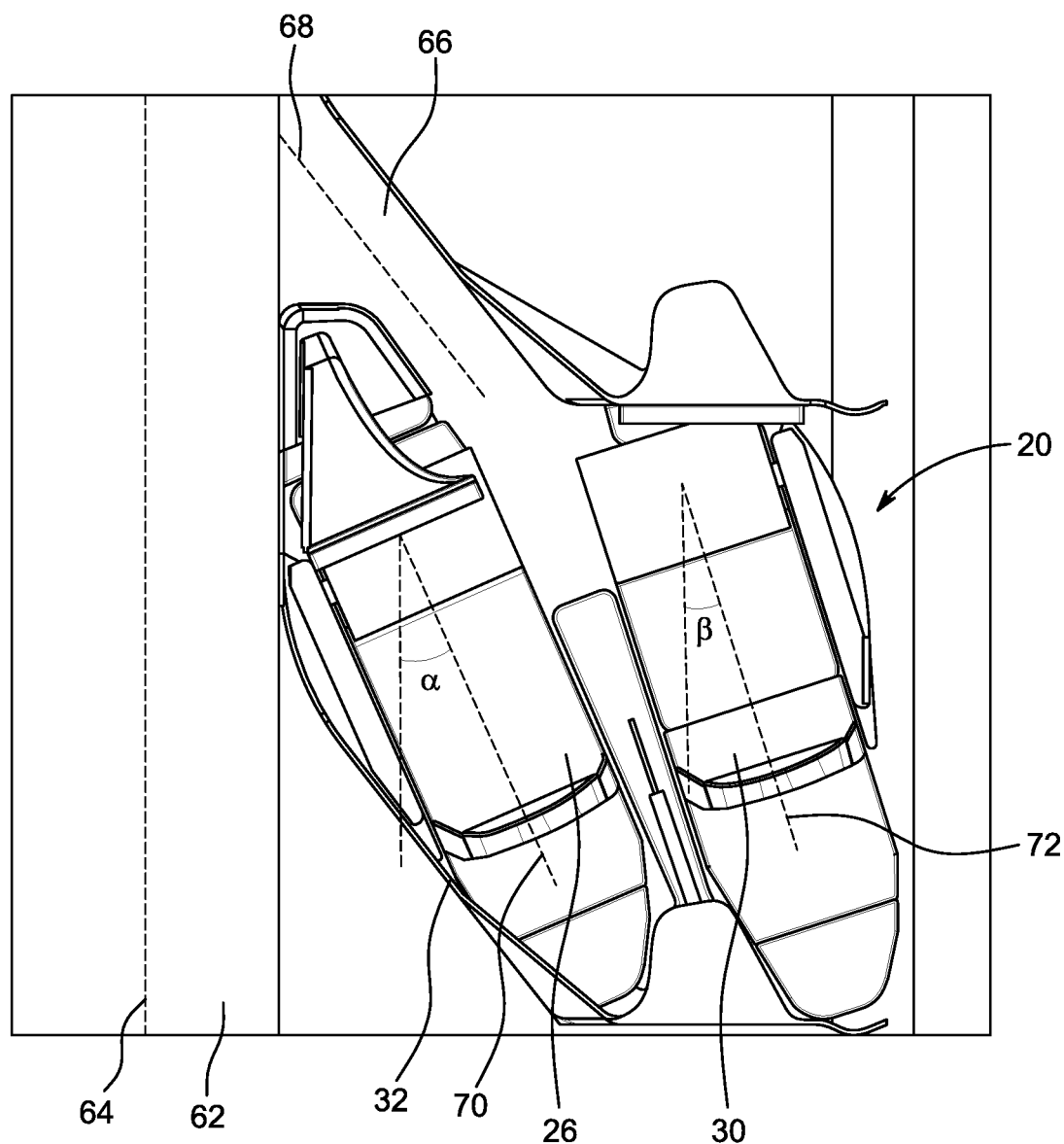
FIG. 5 is a top plan view of an exemplary aircraft passenger seat arrangement incorporating the passenger seat group of FIG. 1.
Figure 6:
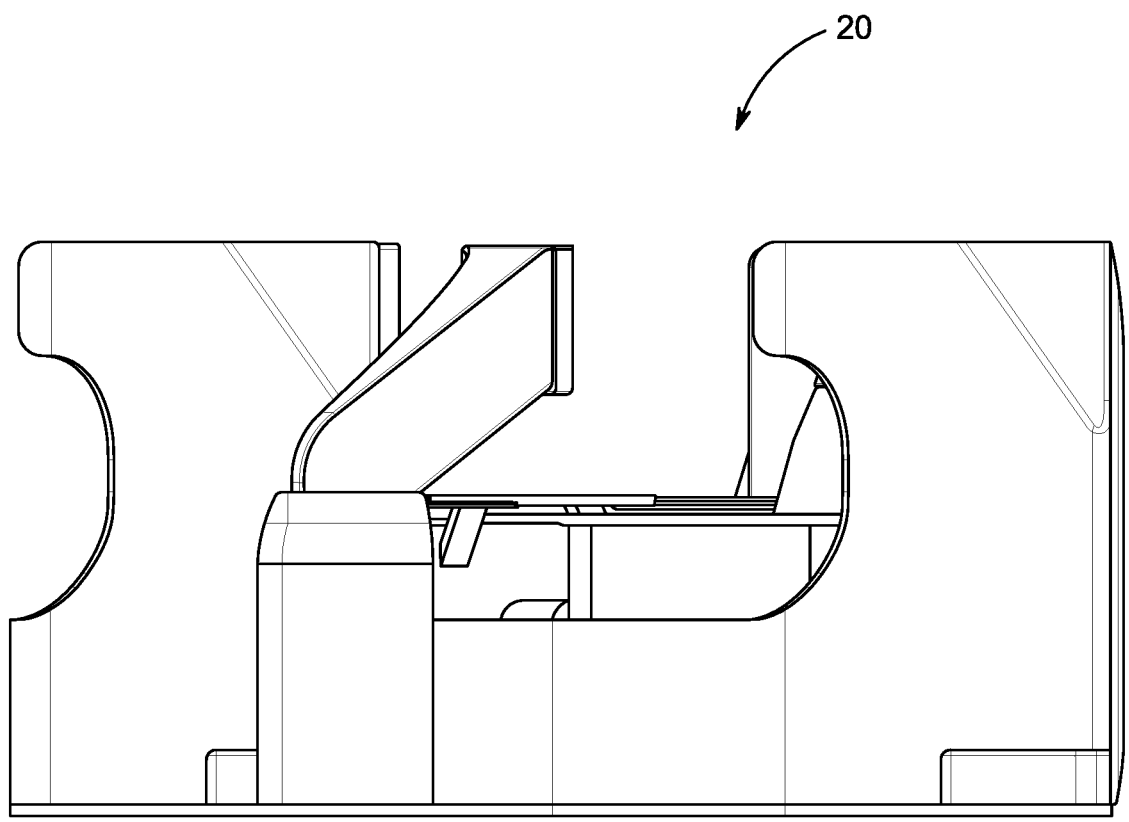
FIG. 6 is an elevational view of the inboard side of the passenger seat group of FIG. 1.
Figure 7:
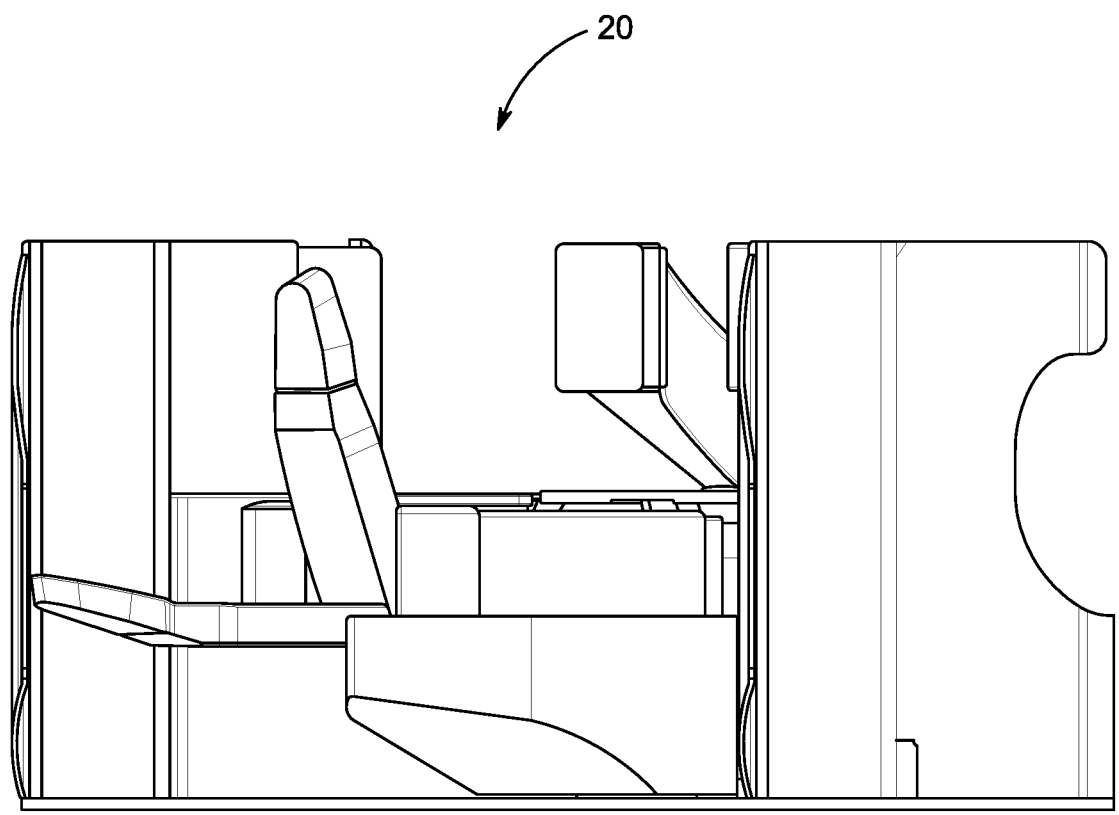
FIG. 7 is an elevational view of the outboard side of the passenger seat group of FIG. 1.
Figure 8:
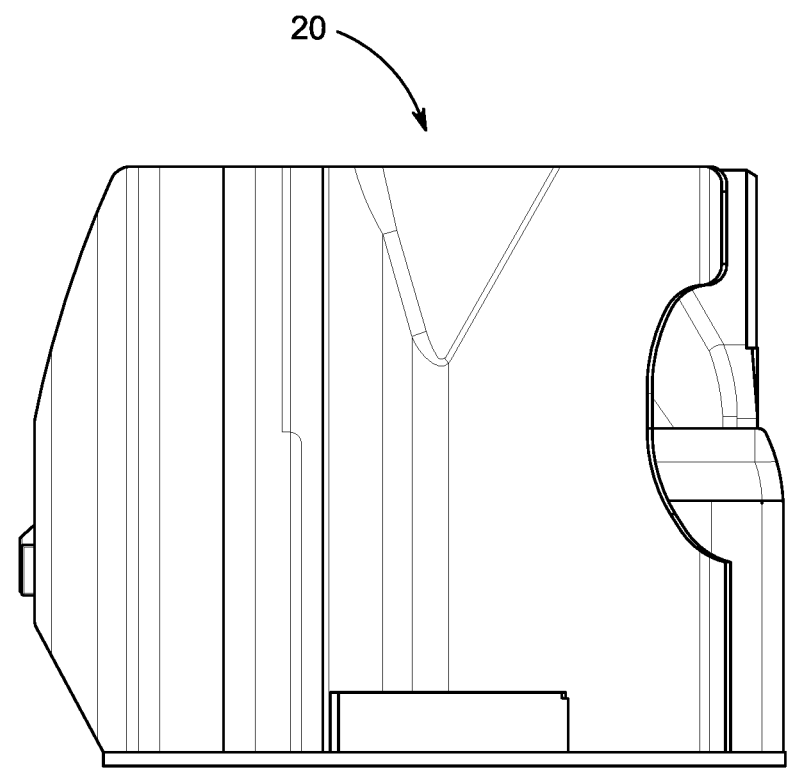
FIG. 8 is an elevational view of the forward end of the passenger seat group of FIG. 1.
Figure 9:
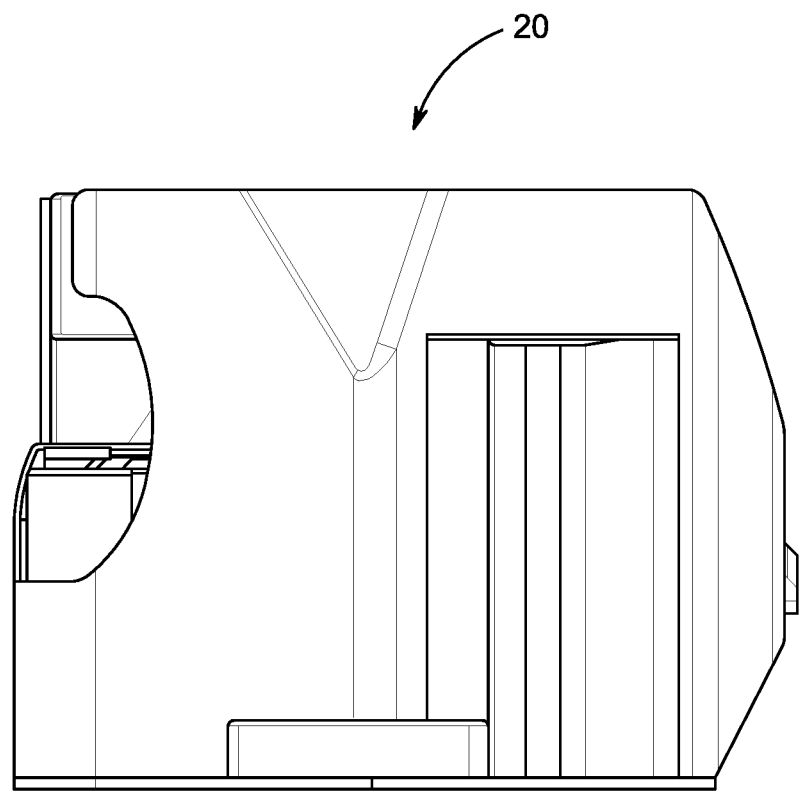
FIG. 9 is an elevational view of the aft end of the passenger seat group of FIG. 1.

FIG. 5 shows a top plan view of a portion of a cabin configuration including a passenger seat group 20 positioned adjacent a longitudinal aisle 62. The aisle axis 64 may be parallel to the aircraft longitudinal axis. The inboard seat 26 is positioned near the longitudinal aisle 62 and the outboard seat is positioned apart from the longitudinal aisle 62. A branch aisle 66 is provided forward of the passenger seat group 20, and more particularly, forward of the inboard seat 26. The branch aisle 66 has an aisle axis 68 at an angle to the longitudinal aisle axis 64. The branch aisle 66 is used to access at least the outboard seat 30 from the longitudinal aisle 62 without having to pass through the seat space dedicated for the inboard passenger and without disturbing the inboard passenger. In some embodiments including an inboard partition 32 extending continuously from the aft end of the passenger seat group 20 to the monument 56, the branch aisle 66 can be used to access both the inboard and outboard seats from the longitudinal aisle 62 without having to pass through either passenger's seat space.

The inboard seat 26 as shown is angled toward the longitudinal aisle 62, and has a longitudinal inboard seat axis 70 at a first angle to the aisle axis 64, shown as angle α. The outboard seat 30 is also angled toward the longitudinal aisle and has a longitudinal outboard seat axis 72 at a second angle to the aisle axis 64, shown as angle β. From FIG. 5, it is apparent that the two angles α and β are different, and particularly, angle α is greater than angle β. For example, each of the first and second angles α and β may be from about 1 degree to about 45 degrees, more preferably from about 10 degrees to about 30 degrees, with the first angle α being greater than the second angle β. In this arrangement, the inboard seat 26 is angled more toward the longitudinal aisle 62 as compared to the outboard seat 30 such that the longitudinal seat axes 66, 68 are not parallel, but converge in a direction of the head end of the inboard and outboard seats 26, 30 and diverge in a direction of the foot end of the inboard and outboard seats 26, 30. This angular arrangement allows a lesser seat pitch in a business seating class as compared to parallel seat axes, while advantageously maximizing branch aisle width. A lesser seat pitch allows a greater seating density in the longitudinal direction in a business seating class without sacrificing passenger space and provides a wider branch aisle for better access to at least the outboard seat 30. In some embodiments, the inboard and outboard seats 26, 30 may be staggered along the longitudinal aircraft axis. For example, the inboard seat 26 may be moved in the forward direction about 2 cm to about 25 cm with respect to the outboard seat 30. Alternatively, the inboard seat 26 may be moved in the aft direction from about 2 cm to about 20 cm with respect to the outboard seat 30. Staggered amounts can be selected to customize seat angles and seat pitch. For example, staggering the seats within the foregoing ranges, while orienting the inboard seat 26 at a greater angle than the outboard seat 30, allows greater seat pitch between longitudinally-adjacent outboard seats as compared to the longitudinally-adjacent inboard seats. In a non-limiting example, utilizing about a 10 degree seat angle for the outboard seats 30 and about a 25 degree seat angle for the inboard seats 26 makes possible about a 10 cm greater seat pitch in the outboard seats 30 as compared to the inboard seats 26.

FIGS. 6-9 shows respective inboard side, outboard side, forward end, and aft end views of the passenger seat group 20 to further illustrate the non-limiting partition configuration and contour for enhancing privacy for the seated passengers.

Figure 10:
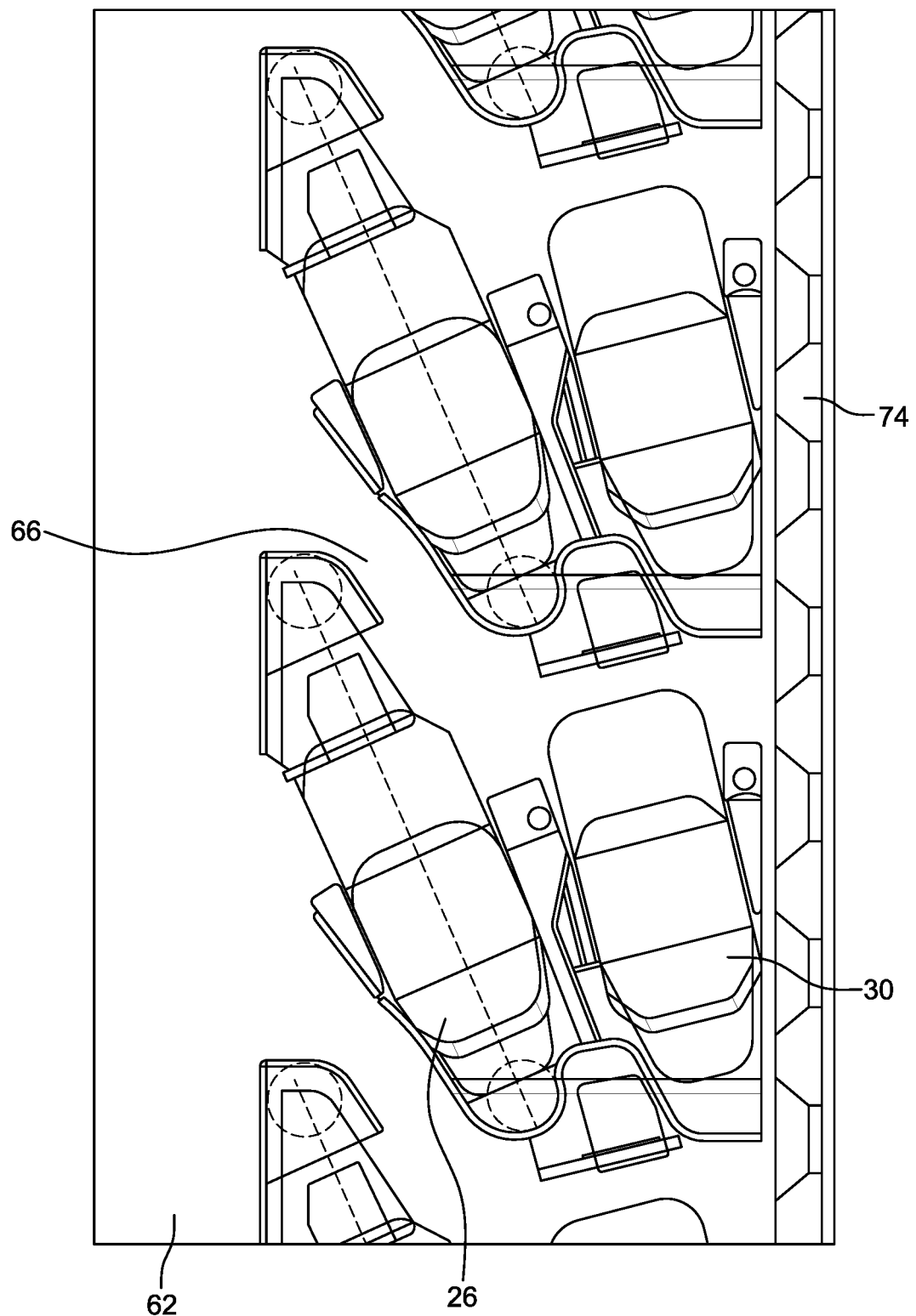
FIG. 10 is a top plan view of an exemplary business class passenger seat arrangement incorporating a plurality of passenger seat groups of FIG. 1.

FIG. 10 shows a portion of a non-limiting example of a business class cabin configuration to illustrate the nesting capabilities of like passenger seat groups 20. Passengers seat groups 20 may be aligned longitudinally-adjacent in a column between the longitudinal aisle 62 and the fuselage wall 74. Each passenger seat is angled toward the longitudinal aisle 62; however, with the inboard seat angle α greater than the outboard seat angle β. A branch aisle 66 is provided between longitudinally-adjacent inboard seats 26, and each branch aisle 66 extends from the longitudinal aisle 62 to generally the forward end of the branch aisle's respective outboard seat 30. In some embodiments, the branch aisle longitudinal axis 68 may be substantially parallel to one of the inboard and outboard longitudinal seat axes 70, 72.

Figure 11:
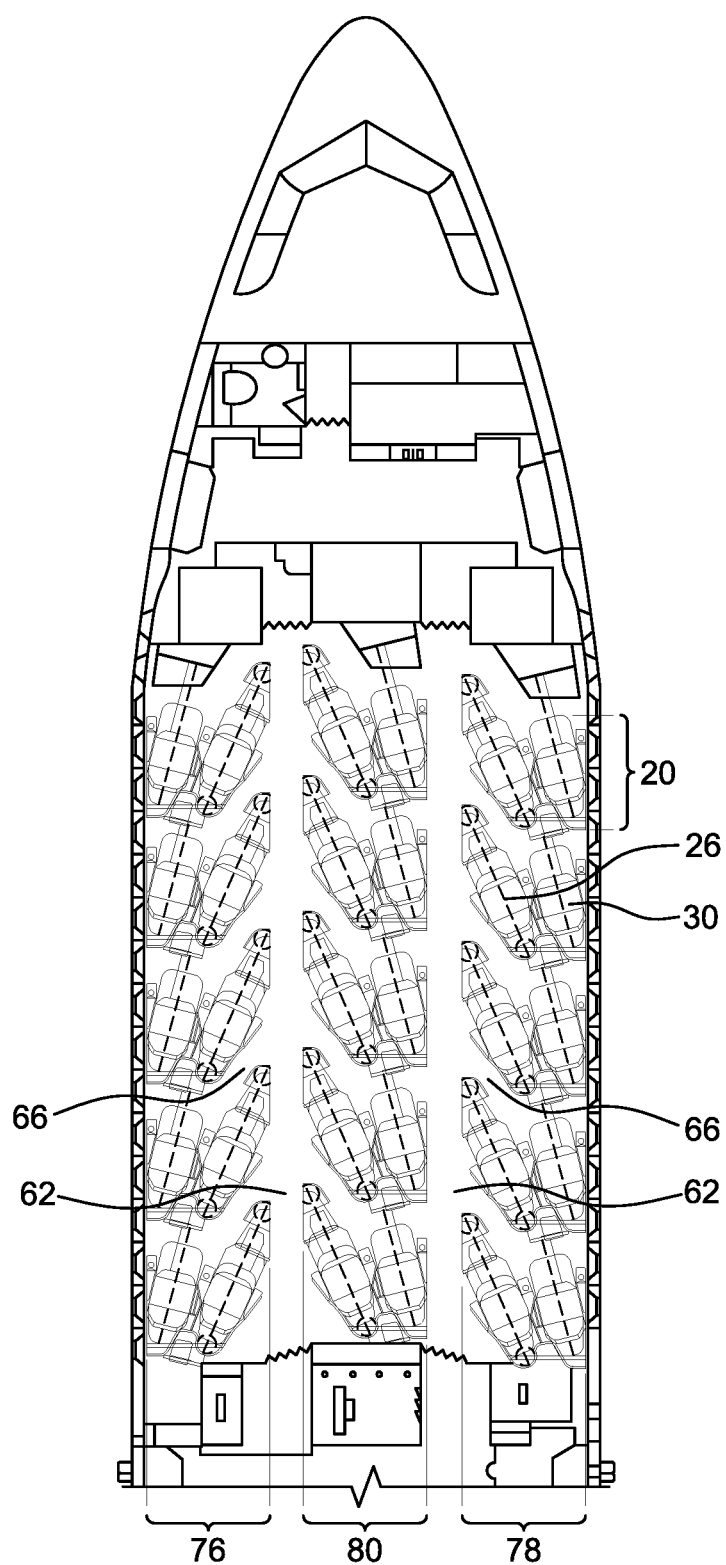
FIG. 11 is a top plan view of an exemplary dual aisle aircraft passenger seat arrangement incorporating two outboard columns and a center column of passenger seat groups of FIG. 1.

FIG. 11 shows a first non-limiting example of a business class cabin configuration including at least one column of passenger seat groups 20. The cabin configuration shown in FIG. 11 is a dual-aisle configuration for a widebody aircraft. Parallel longitudinal aisles 62 divide the cabin into a port column 76, a starboard column 78, and a center column 80. Each of the three columns 76, 78, 80 includes longitudinally-adjacent passenger seat groups 20 according to the embodiments disclosed herein. All passenger seats are forward facing, or generally forward facing considering the slight angle toward their respective longitudinal aisle. As such, the port column seats are angled toward the port-side longitudinal aisle and the starboard column seats are angled toward the starboard-side longitudinal aisle. The center column seats can angle toward either one of the port- and starboard-side longitudinal aisles; however, as shown the center column seats are angled toward the port-side longitudinal aisle, and thus may be configured with outboard side partition walls for privacy between the outboard seats and the starboard-side longitudinal aisle. Galleys and/or lavatories may be positioned forward and/or aft of the business seating class. Branch aisles 66 extend from one of the port-side and starboard-side longitudinal aisles forward of each inboard seat 26 of each passenger seat group 20 for accessing at least the outboard seat 30.

Figure 12:
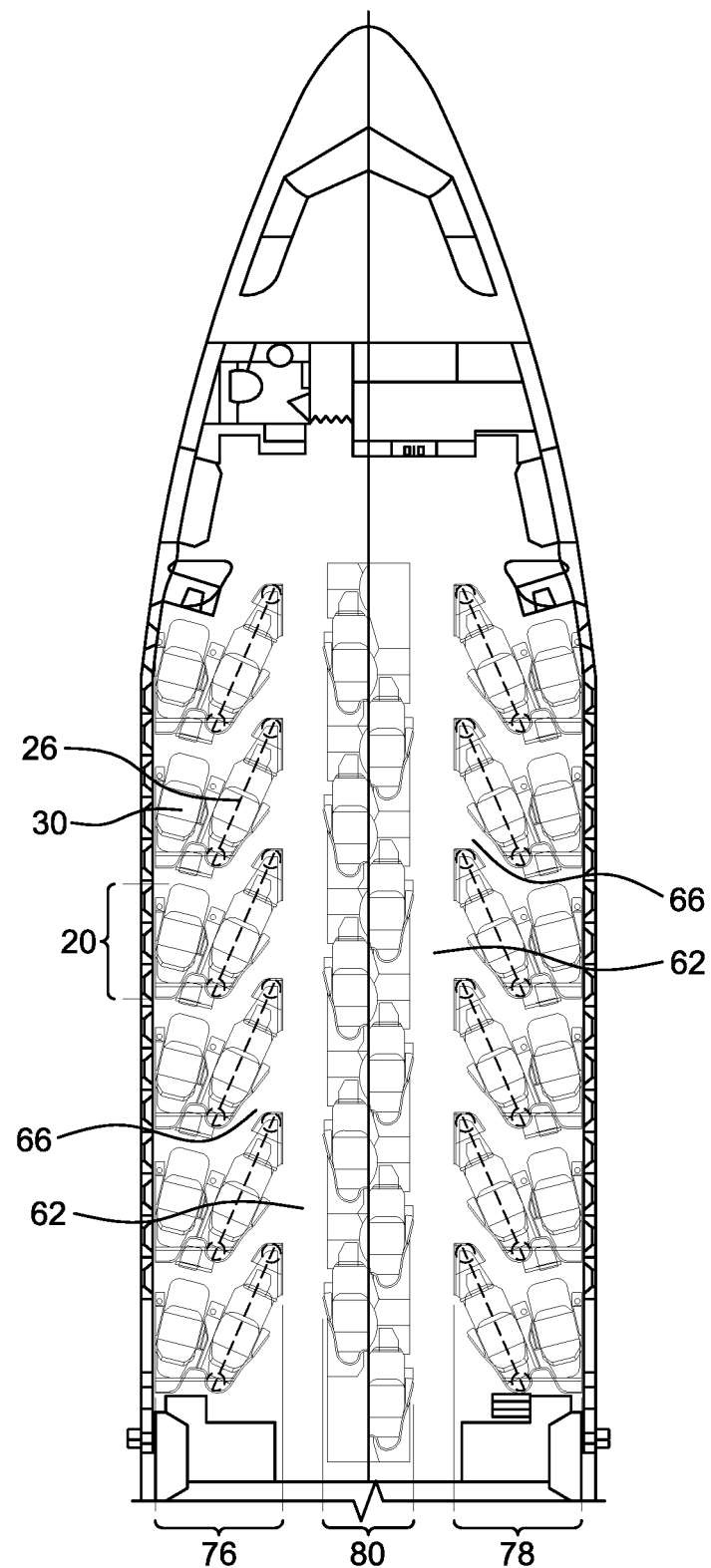
FIG. 12 is a top plan view of an exemplary dual aisle aircraft passenger seat arrangement incorporating two outboard columns of passenger seat groups of FIG. 1.

FIG. 12 shows a second non-limiting example of a business class cabin configuration including at least one column of passenger seat groups 20. The cabin configuration shown in FIG. 12 is another dual-aisle configuration for a widebody aircraft. Parallel longitudinal aisles 62 divide the cabin into a port column 76, a starboard column 78, and a center column 80. The port and starboard columns 76, 78 include longitudinally-adjacent passenger seat groups 20 according to the embodiments disclosed herein, while the center column 80 includes staggered and directly-forward facing passenger seats. All passenger seats are forward facing, or generally forward facing considering the slight angle of the port and starboard columns 76, 78 toward their respective longitudinal aisle. The port column seats are angled toward the port-side longitudinal aisle and the starboard column seats are angled toward the starboard-side longitudinal aisle. Galleys and/or lavatories may be positioned forward and/or aft of the business seating class. Branch aisles 66 extend from one of the port-side and starboard-side longitudinal aisles forward of each inboard seat 26 of each passenger seat group 20 for accessing at least the outboard seat 30.

Figure 13:
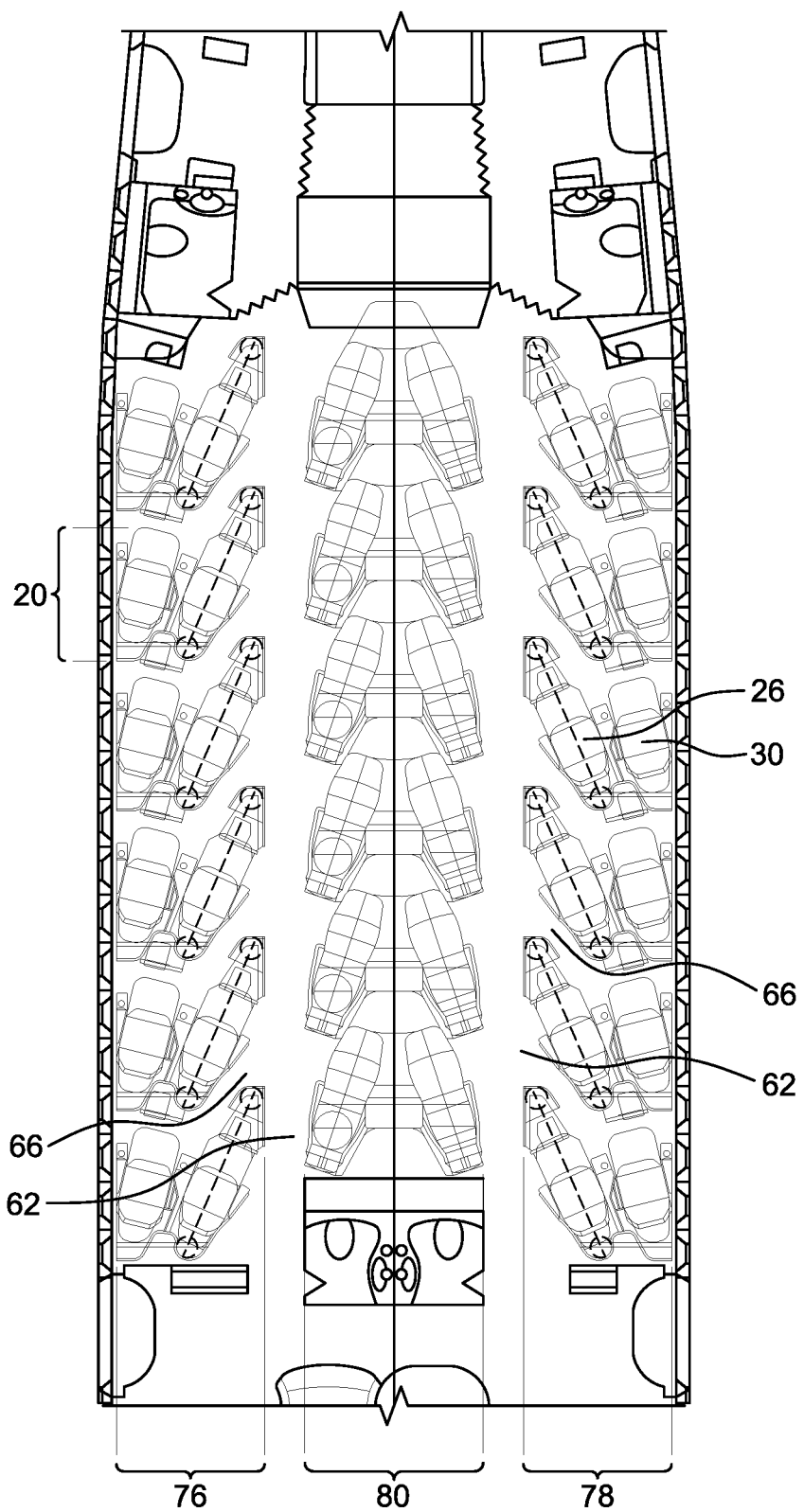
FIG. 13 is a top plan view of another exemplary dual aisle aircraft passenger seat arrangement incorporating two outboard columns of passenger seat groups of FIG. 1.

FIG. 13 shows a third non-limiting example of a business class cabin configuration including at least one column of passenger seat groups 20. The cabin configuration shown in FIG. 13 is yet another dual-aisle configuration for a widebody aircraft. Parallel longitudinal aisles 62 divide the cabin into a port column 76, a starboard column 78, and a center column 80. The port and starboard columns 76, 78 include longitudinally-adjacent passenger seat groups 20 according to the embodiments disclosed herein, while the center column 80 includes centerline-facing passenger seats. All passenger seats are forward facing, or generally forward facing considering the slight seat angles. The port column seats are angled toward the port-side longitudinal aisle and the starboard column seats are angled toward the starboard-side longitudinal aisle. Galleys and/or lavatories may be positioned forward and/or aft of the business seating class. Branch aisles 66 extend from one of the port-side and starboard-side longitudinal aisles forward of each inboard seat 26 of each passenger seat group 20 for accessing at least the outboard seat 30. Each center column seat is accessed directly from its nearest longitudinal aisle.

Figure 14:
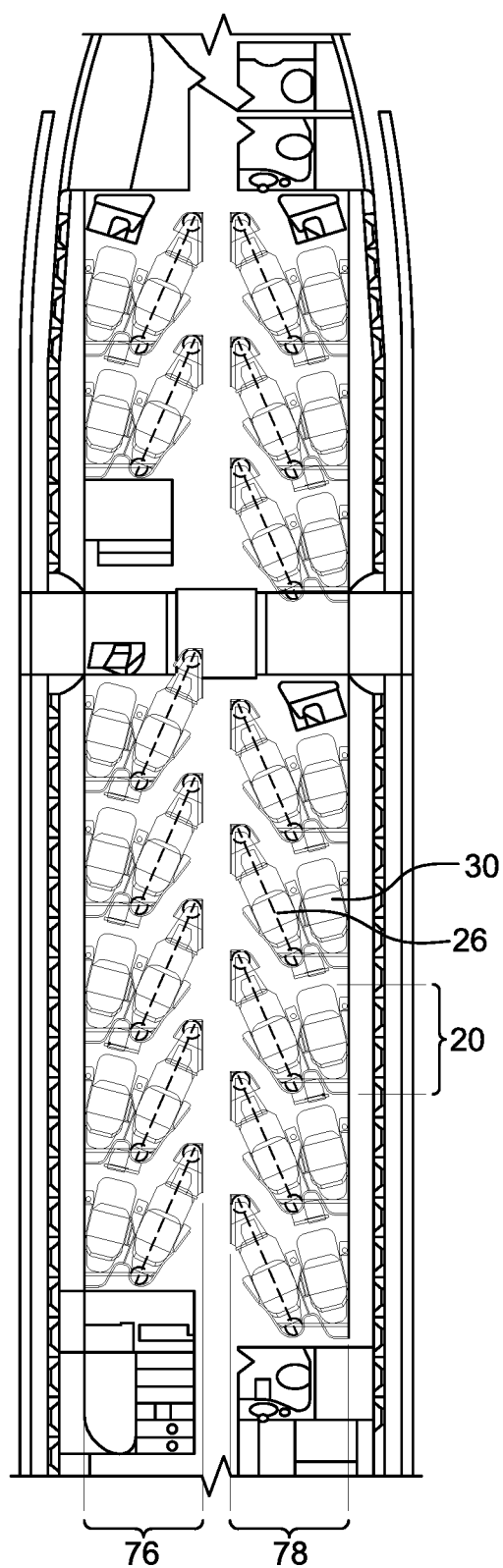
FIG. 14 is a top plan view of an exemplary single aisle aircraft passenger seat arrangement incorporating two outboard columns of passenger seat groups of FIG. 1.

FIG. 14 shows a fourth non-limiting example of a business class cabin configuration including at least one column of passenger seat groups 20. The cabin configuration shown in FIG. 14 is a single aisle configuration for a narrow body aircraft. A single longitudinal aisle 62 along the aircraft centerline divides the cabin into a port column 76 and a starboard column 78. The port and starboard columns 76, 78 each include longitudinally-adjacent passenger seat groups 20 according to the embodiments disclosed herein. All passenger seats are forward facing, or generally forward facing considering the slight angle of the port and starboard columns 76, 78 toward the longitudinal aisle. Galleys and/or lavatories may be positioned forward and/or aft and/or along the length the length of the business seating class. Branch aisles 66 extend from the longitudinal aisle 62 forward of each inboard seat 26 of each passenger seat group 20 for accessing at least the outboard seat 30.

The foregoing description provides embodiments of the inventive concepts by way of example only. It is envisioned that other embodiments may perform similar functions and/or achieve similar results. Any and all such equivalent embodiments and examples are intended to be covered by the appended claims.

What is claimed is:

1. An aircraft passenger seat arrangement, comprising:
    a longitudinal aisle having an aisle axis parallel to an aircraft longitudinal axis;
    a passenger seat group positioned laterally adjacent the longitudinal aisle, the passenger seat group comprising an inboard seat positioned adjacent the longitudinal aisle and an outboard seat positioned laterally adjacent the inboard seat and apart from the longitudinal aisle, the inboard seat having a longitudinal seat axis angled toward the longitudinal aisle at a first angle to the aisle axis and the outboard seat having a longitudinal seat axis angled toward the longitudinal aisle at a second angle to the aisle axis, wherein the first angle is greater than the second angle;
    a branch aisle extending from the longitudinal aisle forward of a forward end of an alcove facing the inboard seat to an aft end of an alcove facing the outboard seat, the branch aisle angled with respect to the aisle axis, and the branch aisle providing access to each of the inboard seat and the outboard seat, along facing sides of the inboard and outboard seats, from the longitudinal aisle; and an inboard partition positioned between the inboard seat and the longitudinal aisle blocking direct access to the inboard seat from the longitudinal aisle.

2. The aircraft passenger seat arrangement of claim 1, wherein the longitudinal seat axes of the inboard and outboard seats converge in a direction of a head end of the inboard and outboard seats and diverge in a direction of a foot end of the inboard and outboard seats.

3. The aircraft passenger seat arrangement of claim 1, wherein the first angle and the second angle are each between 10 degrees and 30 degrees, and wherein the first angle is greater than the second angle.

4. The aircraft passenger seat arrangement of claim 1, further comprising a shared console positioned between the inboard and outboard seats and a deployable partition movable with respect to the shared console, the deployable partition configured to deploy in a horizontal direction across a top of the shared console.

5. The aircraft passenger seat arrangement of claim 1, further comprising a partition, configured in one or more sections, continuous along an aft end and inboard side of the passenger seat group, the partition spaced apart from a head end of each of the inboard and outboard seats to provide room for the inboard and outboard seats to transition from an upright sitting position to a horizontal sleeping position.

6. The aircraft passenger seat arrangement of claim 5, wherein a portion of the partition, along the aft end of the partition between the inboard and outboard seats, contours forward in a direction of the inboard and outboard seats to receive in a nesting arrangement a monument for use by an aft-positioned like outboard seat.

7. The aircraft passenger seat arrangement of claim 5, wherein the partition has a greater vertical height than the inboard partition.

8. The aircraft passenger seat arrangement of claim 1, further comprising a monument positioned between the longitudinal aisle and the branch aisle directly forward of the inboard seat, the monument defining the alcove facing the inboard seat, the alcove opening in a direction of the inboard seat, and an ottoman disposed in the alcove for use by the inboard seat.

9. The aircraft passenger seat arrangement of claim 1, wherein the inboard seat is staggered in a forward direction from 2 cm to 25 cm with respect to the outboard seat or the inboard seat is staggered in an aft direction 2 cm to 20 cm with respect to the outboard seat.

10. A business class aircraft passenger seat arrangement, comprising:
- a longitudinal aisle having an aisle axis parallel to an aircraft longitudinal axis;
- a plurality of passenger seat groups longitudinally aligned in a column laterally adjacent the longitudinal aisle, each of the plurality of passenger seat groups comprising an inboard seat positioned adjacent the longitudinal aisle and an outboard seat positioned laterally adjacent the inboard seat and apart from the longitudinal aisle, the inboard seat having a longitudinal seat axis angled toward the longitudinal aisle at a first angle to the aisle axis and the outboard seat having a longitudinal seat axis angled toward the longitudinal aisle at a second angle to the aisle axis, wherein the first angle is greater than the second angle, and wherein each passenger seat group includes an inboard partition positioned between the inboard seat and the longitudinal aisle blocking direct access to the inboard seat from the longitudinal aisle; and
- a plurality of branch aisles, each branch aisle extending from the longitudinal aisle to each of the inboard seat and the outboard seat of one of the plurality of passenger seat groups, each branch aisle extending from the longitudinal aisle forward of an alcove facing the inboard seat to an aft end of an alcove facing the outboard seat, each branch aisle angled with respect to the aisle axis, and each branch aisle providing access to each of the inboard seat and the outboard seat along facing sides of the inboard and outboard seats;
- wherein, for each of the passenger seat groups, the inboard seat is staggered in a forward direction from 2 cm to 25 cm with respect to the outboard seat, or the inboard seat is staggered in an aft direction 2 cm to 20 cm with respect to the outboard seat.

11. The business class aircraft passenger seat arrangement of claim 10, wherein the longitudinal seat axes of the inboard and outboard seats of each of the passenger seat groups converge in a direction of a head end of the respective inboard and outboard seats and diverge in a direction of a foot end of the respective inboard and outboard seats.

12. The business class aircraft passenger seat arrangement of claim 10, wherein the first angle and the second angle of each of the longitudinal seat axes of each of the plurality of passenger seat groups are between 10 degrees and 30 degrees, and wherein the first angle is greater than the second angle.

13. The business class aircraft passenger seat arrangement of claim 10, wherein each of the plurality of passenger seat groups comprises a shared console positioned between the respective inboard and outboard seats, and a movable partition disposed atop the shared console deployable in a direction of a foot end of the respective inboard and outboard seats and stowable in a direction of a head end of the respective inboard and outboard seats.

14. The business class aircraft passenger seat arrangement of claim 10, wherein each of the plurality of passenger seat groups comprises a partition, configured in one or more sections, continuous along an aft end of the passenger seat group, the partition spaced apart from a head end of each of the respective inboard and outboard seats to provide room for the respective inboard and outboard seats to transition from an upright sitting position to a horizontal sleeping position.

15. The business class aircraft passenger seat arrangement of claim 10, wherein each of the plurality of passenger seat groups comprises a first monument positioned forward of the respective inboard seat for use by the respective inboard seat and a second monument positioned forward of the respective outboard seat for use by the respective outboard, each of the first and second monuments defining an alcove facing the respective one of the inboard and outboard seats and an ottoman disposed on the alcove form use by the respective one of the inboard and outboard seats.

* * * * *